3,262,850
METHODS FOR REDUCING CHOLESTEROL IN THE BLOOD
William Glynne Moss Jones, Jeffrey Meyrick Thorp, and Wilson Shaw Waring, all of Macclesfield, England, assignors to Imperial Chemical Industries Limited, London, England, a corporation of Great Britain
No Drawing. Filed Jan. 8, 1962, Ser. No. 165,041
Claims priority, application Great Britain, June 20, 1958, 19,793/58
4 Claims. (Cl. 167—65)

This invention relates to new pharmaceutical compositions and methods for using same for the purpose of reducing the concentration of cholesterol in the blood. This application is a continuation-in-part of Serial No. 815,311, filed May 25, 1959, now abandoned.

The invention is based on our discovery that certain aryl derivatives of aliphatic acids reduce the concentration of cholesterol in the blood serum.

According to the invention we provide pharmaceutical compositions containing as active ingredient at least one compound of the formula:

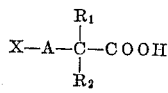

wherein A stands for oxygen or for an imino radical, $R_1$ and $R_2$ which may be the same or different, stand for hydrogen or for alkyl radicals or they may be joined to form, together with the adjacent carbon atom, a cycloalkyl ring, and X stands for a phenyl or naphthyl radical which may optionally be substituted, or the esters or salts thereof, in the presence of a non-toxic pharmaceutically-acceptable inert diluent or carrier therefor.

As particularly suitable alkyl radicals ($R_1$ and $R_2$) there may be mentioned for example methyl and ethyl radicals and a suitable cycloalkyl ring may be the cyclohexane ring. Optional substituents in the phenyl or naphthyl radical may be halogen, alkyl, alkenyl, alkoxy, aryl, aralkyl or arylamino radicals. Preferred esters of the above described acids are the methyl, ethyl and n-propyl esters and suitable salts of the said acids may be the alkali metal or alkaline earth metal salts such as the sodium, potassium or calcium salts or, when the acids possess a strongly basic substituent, the acid-addition salts thereof such as the hydrochlorides.

Preferred compounds to be used as the active ingredient in the compositions of the invention are p-chlorophenoxyisobutyric acid and the esters and salts thereof such as the methyl, ethyl and n-propyl esters and the alkali metal and alkaline earth metal salts such as the potassium salt which is soluble in water and the calcium salt which is sparingly soluble in water. As examples of other active ingredients within the scope of this invention there may be mentioned the following acids and/or their corresponding esters or salts:

phenoxyisobutyric acid;
2-methylphenoxyisobutyric acid;
3-methylphenoxyisobutyric acid;
4-methylphenoxyisobutyric acid;
2-chlorophenoxyisobutyric acid;
3-chlorophenoxyisobutyric acid;
4-bromophenoxyisobutyric acid;
2:4-dichlorophenoxyisobutyric acid;
2:4:5-trichlorophenoxyisobutyric acid;
3:4-dimethylphenoxyisobutyric acid;
4-methoxyphenoxyisobutyric acid;
α-Naphthoxyisobutyric acid;
β-Naphthoxyisobutyric acid;
α-(p-Chlorophenoxy)α-methyl-n-butyric acid;
α-(p-Chlorophenoxy)propionic acid;
α-(p-Chloroanilino)isobutyric acid;
1-anilinocyclohexane carboxylic acid;
4-ethylphenoxyisobutyric acid, M.P. 77–78° C.;
4-tertiary butylphenoxyisobutyric acid, M.P. 93–94° C.;
4-phenylphenoxyisobutyric acid, M.P. 167–168° C.;
4-tertiary octylphenoxyisobutyric acid, M.P. 89–90° C.;
2-methoxyphenoxyisobutyric acid, M.P. 45–47° C.;
3-methyl-4-chlorophenoxyisobutyric acid, M.P. 85–86° C.;
Ethyl-2-methoxy-4-allylphenoxyisobutyrate, B.P. 118–120° C./0.2 mm.;
Ethyl 2-benzylphenoxyisobutyrate, B.P. 152–156° C./0.4 mm.;
Ethyl 3:4-dichlorophenoxyisobutyrate, B.P. 104° C./0.2 mm.;
Ethyl 2-methoxy-4-propenylphenoxyisobutyrate, B.P. 128–132° C./0.3 mm.;
Ethyl 4-(αα-dimethyl-n-butyl)phenoxyisobutyrate, B.P. 127° C./0.7 mm.;
Ethyl 4-benzylphenoxyisobutyrate, B.P. 149–152° C./0.5 mm.;
Ethyl 2-phenylphenoxyisobutyrate, B.P. 126° C./0.2 mm.;
Ethyl 4-anilinophenoxyisobutyrate, B.P. 185–190° C./0.5 mm.;
Ethyl 4-benzyloxyphenoxyisobutyrate, B.P. 180–190° C./0.6 mm.;
4-benzyloxyphenoxyisobutyric acid, M.P. 134–135° C.;
1-p-chloroanilinocyclohexane carboxylic acid, M.P. 159° C.;
2-chloroanilinoisobutyric acid, M.P. 87–88° C.;
n-Butyl 4-chlorophenoxyisobutyrate, B.P. 178–182° C./15 mm.;
n-Propyl 4-chlorophenoxyisobutyrate, B.P. 167–169° C./15 mm.;
Methyl 4-chlorophenoxyisobutyrate, B.P. 148–150° C./20 mm.; and
4-chloroanilinoisobutyric acid, M.P. 142–143° C.

The pharmaceutical compositions may be formulated so as to be suitable for oral administration. For such purposes the active ingredient can be mixed with suitable known pharmaceutical excipients and incorporated by known means into such formulations as tablets, capsules, suspensions, emulsions, solutions or dispersible powders.

Active ingredients which are liquids at ordinary temperatures may be formulated as emulsions wherein the active ingredient itself or a solution of the active ingredient in an orally-acceptable oil, for example sunflower seed oil, maize oil or cod liver oil, constitutes the oil phase. Emulsions are prepared with the aid of emulsifying agents, examples of which are sorbitan trioleate, polyoxyethylene sorbitan mono-oleate, lecithin, gum acacia and gum tragacanth. The emulsions may contain in addition preservatives, antioxidants, flavouring and sweeting agents and colouring materials.

Active ingredients which are sparingly soluble in water, for example p-chlorophenoxyisobutyric acid and its calcium salt, may be formulated as suspensions either in an aqueous base or in an emulsion base. Aqueous-based suspensions are prepared with the aid of wetting agents for example polyethyleneoxide condensation products of alkyl phenols, fatty alcohols or fatty acids and suspending agents for example hydrophilic colloids such as polyvinylpyrrolidone. Emulsion-based suspensions are prepared by suspending the active ingredient with the aid of wetting agents and suspending agents in the emulsion base which is prepared with the aid of emulsifying agents such as those described above. The suspension formulations may in addition contain sweetening agents, flavouring agents, colouring materials, preservatives and antioxidants.

Syrups or elixirs suitable for oral administration may be prepared from water-soluble salts for example potassium p-chlorophenoxyisobutyrate and may advantageously contain glycerol and ethyl alcohol as solvents or preservatives. They may in addition contain sweetening agents and flavouring agents for example essential oils and colouring materials.

Liquid or solid formulations may be filled into capsules for oral administration. Active ingredients which are liquids may be dissolved in oils of vegetable or animal origin, for example sunflower seed oil, maize oil or cod-liver oil, and may contain additional ingredients for example antioxidants such as wheat germ oil. Solid formulations suitable for filling into capsules may contain the solid active ingredient for example p-chlorophenoxyisobutyric acid in admixture with solid materials which have a buffering action for example colloidal aluminium hydroxide or calcium hydrogen phosphate.

Formulations of the compositions of the invention as tablets which may be coated and either effervescent or non-effervescent may be carried out according to the known art. Inert diluents or carriers for example magnesium carbonate or lactose are used together with conventional disintegrating agents for example maize starch and alginic acid and lubricating agents for example magnesium stearate.

Compositions of the invention may also be in the form of a nutritive preparation in which the active ingredient is mixed with proteins and carbohydrates for example casein.

The compositions described above may in addition contain dietary supplements, for example vitamins, salts of glycerophosphoric acid, choline and inositol, the combination of which is known to be effective in reducing serum cholesterol levels, and amino acids, for example methionine which has a lipotropic action similar to choline.

As indicated above, the compositions of the invention are useful in reducing the cholesterol content of blood. It is expected that the compositions will generally be administered orally in the form of capsules containing between about 0.1 and 1.0 gm. of liquid or solid active ingredient or in the form of tablets, either effervescent or non-effervescent, containing between about 0.1 and 3.0 gm. of solid active ingredient, these compositions being administered such that a patient undergoing treatment receives a daily dosage of between about 1.0 and 10 gm. of active ingredient.

The invention is illustrated but not limited by the following Examples 1–15 in which the parts are by weight:

*Example 1*

A solution of 200 parts of cane sugar, 1 part of sodium benzoate, 0.6 part of pyridoxine hydrochloride and 10 parts of a polyoxyethylene sorbitan mono-oleate condensate in 400 parts of water is added slowly to a stirred mixture of 500 parts of ethyl p-chlorophenoxyisobutyrate, 25 parts of refined soya bean lecithin, 2.4 parts of a mixed tocopherols concentrate and 0.05 part of propyl gallate. The resultant emulsion is homogenised by passage through a conventional homogeniser and there is thus obtained an emulsion suitable for oral administration for therapeutic purposes.

The ethyl p-chlorophenoxyisobutyrate used as starting material may be obtained by heating a mixture of 206 parts of dry p-chlorophenoxyisobutyric acid, 1,000 parts of ethanol and 40 parts of concentrated sulphuric acid under reflux during 5 hours. The alcohol is then distilled off and the residue is diluted with water and extracted with chloroform. The chloroform extract is washed with sodium hydrogen carbonate solution, dried over sodium sulphate and the chloroform removed by distillation. The residue is distilled under reduced pressure and there is obtained ethyl p-chlorophenoxyisobutyrate, B.P. 148–150° C./20 mm..

*Example 2*

To a stirred solution of 200 parts of ethyl p-chlorophenoxyisobutyrate, 5 parts of a mixed tocopherol concentrate, 0.1 part of propyl gallate, 50 parts of a polyoxyethylene sorbitan mono-oleate condensate, and 50 parts of sorbitan tri-oleate in 500 parts of maize oil is added a solution of 54 parts of sodium cyclamate, 1 part of pyridoxine hydrochloride, 3 parts of methyl p-hydroxybenzoate and 1 part of propyl p-hydroxybenzoate in 960 parts of water. A suitable flavouring agent is incorporated in the mixture which is then homogenised by passage through a conventional homogeniser. There is thus obtained an emulsion suitable for oral administration for therapeutic purposes.

*Example 3*

To a mixture of 40 parts of p-chlorophenoxyisobutyric acid and 33.7 parts of liquid paraffin are added 3 parts of gum acacia and 1.5 parts of gum tragacanth. To the thoroughly triturated mixture is added slowly with stirring a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of edible dyestuff in 110 parts of water. After the incorporation of a suitable flavouring agent, the mixture is homogenised by passage through a conventional homogeniser and there is thus obtained an emulsion suitable for oral administration for therapeutic purposes.

The p-chlorophenoxyisobutyric acid used as starting material may be obtained as follows: A mixture of 200 parts of p-chlorophenol, 1,000 parts of acetone and 360 parts of sodium hydroxide pellets is heated under reflux and 240 parts of chloroform are gradually added at such a rate that the mixture continues to reflux without further application of heat. When addition is complete the mixture is heated under reflux during 5 hours and then the acetone is removed by distillation. The residue is dissolved in water, acidified with hydrochloric acid and the mixture extracted with chloroform. The chloroform extract is stirred with sodium hydrogen carbonate solution and the aqueous layer is separated. The alkaline extract is acidified with hydrochloric acid and filtered. The solid product is drained free from oil on a filter pump, then washed with petroleum ether (B.P. 40–60° C.), and dried at 50° C. The solid residue, M.P. 114–116° C., may be crystallised from methanol (with the addition of charcoal) to give p-chlorophenoxyisobutyric acid, M.P. 118–119° C.

*Example 4*

In a similar manner to that described in Example 3 but replacing the 33.7 parts of liquid paraffin by 30 parts of maize oil containing 0.01 part of propyl gallate, there is obtained an emulsion suitable for oral administration for therapeutic purposes.

*Example 5*

100 parts of calcium p-cholophenoxyisobutyrate are added to a solution of 15 parts of calcium cyclamate, 2 parts of a condensation product of octylcresol with 8–10 molecular proportions of ethylene oxide, 3 parts of polyvinyl pyrrolidone and 0.9 part of methyl p-hydroxybenzoate in 500 parts of water. The mixture is ball-milled for several hours and after the incorporation of a suitable flavouring agent there is obtained a suspension suitable for oral administration for therapeutic purposes.

*Example 6*

A mixture of 40 parts of p-chlorophenoxyisobutyric acid, 40 parts of sucrose, 0.5 part of a cetyl alcohol polyethylene oxide condensate, 1 part of polyvinyl pyrrolidone, 0.25 part of methyl p-hydroxybenzoate and 100 parts of water is ball-milled for several hours. After the incorporation of suitable colouring and flavouring agents there is obtained a suspension suitable for oral administration for therapeutic purposes.

Example 7

200 parts of potassium p-chlorophenoxyisobutyrate are dissolved in a mixture of 83 parts of water, 250 parts of glycerol and 125 parts of ethyl alcohol. To the resultant solution is added a solution of 300 parts of sucrose in 150 parts of water. By the incorporation of a suitable flavouring agent and colouring matter, there is obtained a syrup suitable for oral administration for therapeutic purposes.

Example 8

200 parts of ethyl p-chlorophenoxyisobutyrate and 5 parts of wheat germ oil are dissolved in 750 parts of sunflower seed oil. The solution is filled into gelatine capsules which are then suitable for oral administration for therapeutic purposes.

Example 9

25 parts of sodium glycerophosphate, 25 parts of calcium glycerophosphate and 50 parts of calcium p-chlorophenoxyisobutyrate are intimately mixed. The mixture is added gradually to 900 parts of soluble casein in a conventional mixer and mixing continued until homogeneous. There is thus obtained a dietary supplement suitable for oral administration for therapeutic purposes.

Example 10

An intimate mixture is prepared with conventional mixing equipment of 3 parts of pyridoxine hydrochloride, 100 parts of nicotinic acid, 100 parts of nicotinamide, 5 parts of methionine, 15 parts of choline bitartrate, 150 parts of ascorbic acid, 5 parts of calcium pantothenate, 10 parts of riboflavin and 1,000 parts of calcium p-chlorophenoxyisobutyrate. The mixture is filled into capsules which are then suitable for oral administration for therapeutic purposes.

Example 11

A mixture of 500 parts of calcium p-chlorophenoxyisobutyrate, 94 parts of maize starch, 45 parts of alginic acid and 3.5 parts of magnesium stearate, is compressed into slugs which are then broken into granules. The granules are passed through an 8-mesh screen and 3.5 parts of magnesium stearate are added. The mixture is then compressed into tablets which are suitable for oral administration for therapeutic purposes.

Example 12

A mixture of 1 part of sodium di-octyl sulphosuccinate dissolved in a sufficient quantity of methanol, 500 parts of calcium p-chlorophenoxyisobutyrate, 75 parts of maize starch and 5 parts of alginic acid is granulated by admixture with a sufficient quantity of aqueous 10% maize starch paste. The granules are passed through a 12-mesh screen and dried at 50–55° C. The granules are then again passed through a 12-mesh screen and 6 parts of magnesium stearate are added and the mixture is compressed. There are thus obtained tablets suitable for oral administration for therapeutic purposes.

Example 13

A mixture of 500 parts of potassium p-chlorophenoxyisobutyrate, 50 parts of light magnesium carbonate and 10 parts of magnesium stearate is compressed into slugs. The slugs are broken into granules which are passed through an 8-mesh screen and compressed. There are thus obtained tablets suitable for oral administration for therapeutic purposes.

Example 14

A mixture of 500 parts of potassium p-chlorophenoxyisobutyrate and 50 parts of light magnesium carbonate is granulated by admixture with a solution of 2 parts of sodium di-octyl sulphosuccinate in a sufficient quantity of methanol. The granules are passed through a 12-mesh screen and dried at 50–55° C. The granules are then again passed through a 12-mesh screen and 8 parts of magnesium stearate are added and the mixture is compressed. There are thus obtained tablets suitable for oral administration for therapeutic purposes.

Example 15

A mixture of 500 parts of p-chlorophenoxyisobutyric acid, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethyl alcohol; 3 parts of magnesium stearate are then added to the granules after which they are compressed to give tablets suitable for oral use for therapeutic purposes.

It is to be understood that the solid or liquid active ingredients in the foregoing Examples 1–15 may be replaced by any of the solid or liquid active ingredients listed at the beginning of the specification.

The compounds used as the active ingredient in the compositions of the invention may be prepared by any means according to the known art. Certain of the said compounds are new compounds and these new compounds of the formula:

wherein $R_1$ and $R_2$, which may be the same or different, stand for hydrogen, or for alkyl radicals or they may be joined together to form, with the adjacent carbon atom, a cycloalkyl ring, and B stands for an oxygen atom and Y stands for a dihalogenated phenyl radical or for a phenyl radical containing at least one substituent selected from the group consisting of alkyl of at least two carbon atoms, alkenyl, aryl, aralkyl and arylamino radicals or for a naphthyl radical optionally substituted, or B stands for an imino radical and Y stands for a phenyl or naphthyl radical optionally substituted, may be prepared by one of several methods according to the substituents required in the molecular structure. Thus certain of them may be prepared by interaction of the corresponding phenol or naphthol of the formula Y—OH wherein Y has the meaning stated above and a ketone of the formula $R_3 \cdot CO \cdot R_4$ wherein $R_3$ and $R_4$ stand for alkyl radicals, the same or different, or they may be joined together to form, with the adjacent carbon atom, a cycloalkyl ring in the presence of a tri- or tetra-halogenated methane derivative and a strong base.

As a suitable tri- or tetra-halogenated methane derivative there may be mentioned for example chloroform, acetonechloroform, bromoform, acetonebromoform, chloral, bromal, chloral hydrate, bromal hydrate, carbon tetrachloride or carbon tetrabromide, and a suitable strong base may be sodium hydroxide or potassium hydroxide, particularly in the solid form.

The process may conveniently be carried out in the presence of a diluent or solvent such as excess of the ketone used as reactant. The reaction may be accelerated or completed by the application of heat.

The new compounds may also be prepared by interaction of a metal derivative of the corresponding phenol or naphthol of the formula Y—OH wherein Y has the meaning stated above and a compound of the formula:

wherein $R_3$ and $R_4$ have the meaning stated above, Hal stands for a halogen atom and $R^5$ stands for an alkyl radical.

A suitable metal derivative may be an alkali metal derivative such as the sodium salt of the phenol or naphthol.

The process may be conveniently carried out by the application of heat and there is preferably present an inert diluent or solvent for example benzene, toluene, xylene or ethanol.

The new compounds as hereinbefore described which have a free carboxyl group may be converted into the corresponding esters or salts thereof by conventional means, and likewise the esters or salts may be converted into the corresponding acids by conventional means.

The new compounds may also be prepared by hydrolysis of a compound of the formula:

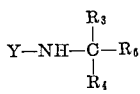

wherein $R_3$ and $R_4$ have the meaning stated above, Y stands for a phenyl or naphthyl radical optionally substituted and $R_6$ stands for a carboxy amide radical or for a functional derivative or precursor thereof.

As a suitable precursor of the carboxy amide derivatives there may be mentioned for example the corresponding nitriles. The hydrolysis may conveniently be carried out in the presence of concentrated aqueous hydrochloric acid preferably with application of heat.

The carboxy amides of the above stated formula used as starting materials may conveniently be obtained by hydrolysis of the corresponding nitriles in the presence of concentrated sulphuric acid at ordinary temperature. The nitriles themselves may conveniently be obtained by the addition of an aqueous solution of an alkali metal cyanide to a mixture of the corresponding ketone of the formula:

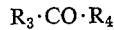

wherein $R_3$ and $R_4$ have the meaning stated above and a primary aromatic amine of the formula:

wherein Y stands for a phenyl or naphthyl radical optionally substituted in the presence of glacial acetic acid.

Illustrated procedures for the preparation of the new compounds are given in the following Examples 16-21 in which the parts are by weight:

*Example 16*

A mixture of 50 parts of p-ethylphenol, 400 parts of acetone and 90 parts of sodium hydroxide pellets is heated under reflux, and 60 parts of chloroform are gradually added at such a rate that the mixture continues to reflux without further application of heat. When addition is complete, the mixture is heated under reflux during 5 hours and then the acetone is removed by distillation. The residue is dissolved in water, acidified with aqueous hydrochloric acid and the mixture extracted with chloroform. The chloroform extract is stirred with sodium hydrogen carbonate solution and the aqueous layer is separated. The alkaline extract is acidified with aqueous hydrochloric acid and filtered. The solid residue is crystallised from benzene to give 4-ethylphenoxyisobutyric acid, M.P. 77–78° C.

In a similar manner, 4-tertiary-butylphenoxyisobutyric acid, M.P. 93–94° C. (crystallised from petroleum ether, B.P. 40–60° C.) is obtained from p-tertiary butylphenol; 4-phenylphenoxyisobutyric acid, M.P. 167–168° C. (crystallised from benezene) is obtained from 4-hydroxydiphenyl; 4-tertiary-octylphenoxyisobutyric acid, M.P. 89–90° C. (crystallised from petroleum ether, B.P. 40–60° C.) is obtained from 4-tertiary-octylphenol; 3-methyl-4-chlorophenoxyisobutyric acid, M.P. 85–86° C. (crystallised from chloroform) is obtained from 2-chloro-5-hydroxytoluene; and 2-methoxyphenoxyisobutyric acid, B.P. 120–130° C./0.3 mm., M.P. 45–47° C., is obtained from guaiacol.

*Example 17*

A mixture of 50 parts of eugenol, 400 parts of acetone and 90 parts of sodium hydroxide pellets is heated under reflux, and 60 parts of chloroform are gradually added at such a rate that the mixture continues to reflux without further application of heat. When the addition of chloroform is complete, the mixture is heated under reflux during 5 hours. The reaction mixture is treated in the manner as described in Example 16 and there is obtained a crude acid in the form of an oil. This crude acid is heated under reflux with 250 parts of ethanol and 10 parts of concentrated sulphuric acid for 4 hours. The mixture is cooled, diluted with water and extracted with ether. The ethereal extract is washed with sodium hydrogen carbonate solution and water, and then dried over sodium sulphate. The solvent is removed by distillation and the residue is distilled under reduced pressure and there is obtained ethyl (2 - methoxy - 4 - allylphenoxy)isobutyrate, B.P. 118–120° C./0.2 mm.

In a similar manner, ethyl (o-benzylphenoxy)isobutyrate, B.P. 152–156° C./0.4 mm., is obtained from o-benzylphenol; ethyl 3:4-dichlorophenoxyisobutyrate, B.P. 104° C./0.2 mm., is obtained from 3:4-dichlorophenol; ethyl 2 - methoxy - 4 - propenylphenoxyisobutyrate, B.P. 128–132° C./0.3 mm., is obtained from isoeugenol; and ethyl 4 - (αα-dimethyl-n-butyl)phenoxyisobutyrate, B.P. 127° C./0.7 mm., is obtained from 4-(αα-dimethyl-n-butyl)phenol.

*Example 18*

18.4 parts of p-benzylphenol and 200 parts of dry xylene are heated under reflux, and 2.3 parts of sodium are added and heating is continued during 4 hours. 23 parts of ethyl α-bromo-isobutyrate are then added and the mixture is then heated under reflux for a further 5 hours. The mixture is cooled, diluted with water and extracted with ether. The extract is dried over sodium sulphate and the solvents are removed by distillation and the residue is then distilled under reduced pressure. There is thus obtained ethyl (4-benzylphenoxy)-isobutyrate, B.P. 149–152° C./0.5 mm.

In a similar manner, ethyl (2-phenylphenoxy)isobutyrate, B.P. 126° C./0.2 mm., is obtained from 2-hydroxydiphenyl; ethyl (4 - anilinophenoxy)isobutyrate, B.P. 185–190° C./0.5 mm. (hydrochloride, M.P. 171–172° C. with decomposition when crystallised from ethanol), is obtained from 4-hydroxydiphenylamine; and ethyl 4 - benzyloxyphenoxyisobutyrate, B.P. 180–190° C./0.6 mm., is obtained from hydroquinone monobenzyl ether, and is hydrolysed by heating with potassium hydroxide in methanol to 4-benzyloxyphenoxyisobutyric acid, M.P. 134–135° C. after crystallisation from benzene.

*Example 19*

A mixture of 27 parts of dry 4-chlorophenoxyisobutyric acid, 250 parts of n-butanol and 18 parts of concentrated sulphuric acid are boiled under reflux for 16 hours, and the water formed during the reaction is removed continuously by means of a suitable take-off apparatus. The butanol is removed by distillation under reduced pressure and the residue diluted with water and extracted with ether. The ether solution is washed with dilute sodium hydroxide solution, then with water, and dried over sodium sulphate, and the ether removed by distillation. The residue is distilled under reduced pressure giving n - butyl - 4 - chlorophenoxyisobutyrate, B.P. 178–182° C./15 mm.

In a similar way n-propyl 4-chlorophenoxyisobutyrate, B.P. 167–169° C./15 mm., is obtained from 4-chlorophenoxyisobutyric acid and n-propanol.

*Example 20*

9 parts of 4-chlorophenoxyisobutyric acid are added to a solution of excess diazomethane in ether, and the mixture is left at room temperature overnight. The ether is removed by distillation and the residue distilled under reduced pressure giving methyl 4-chlorophenoxyisobutyrate, B.P. 148–150° C./20 mm.

*Example 21*

A mixture of 43 parts of α-p-chloroanilinoisobutyramide and 200 parts of concentrated aqueous hydrochloric acid is heated at 95–100° C. during 18 hours. It is then cooled and filtered. The solid residue is treated with hot dilute aqueous sodium hydroxide and filtered. The filtrate is acidified with acetic acid and the mixture is filtered. The solid residue is crystallised from benzene and there is obtained 4-chloroanilinoisobutyric acid, M.P. 142–143° C.

The α-p-chloroanilino-isobutyramide used as starting material in the above process may be obtained by stirring 40 parts of α-p-chloroanilinoisobutyronitrile and 100 parts of concentrated sulphuric acid at 18–22° C. during 18 hours. The mixture is poured on ice and basified with ammonium hydroxide. The mixture is filtered and the solid residue is crystallised from benzene to give α-p-chloroanilino-isobutyramide, M.P. 137–138° C. The α-p-chloroanilino-isobutyronitrile itself may be obtained by stirring a mixture of 70 parts of acetone, 127 parts of p-chloroaniline and 400 parts of glacial acetic acid, cooled in ice, while a solution of 49 parts of sodium cyanide in 100 parts of water is gradually added. The mixture is stirred for 1 hour and filtered. The solid residue is washed with water and dried. It is then crystallised from methanol to give α-p-chloroanilino-isobutyronitrile, M.P. 95° C.

In a similar way 1-p-chloroanilinocyclohexane carboxyamide on hydrolysis with concentrated hydrochloric acid gives 1-p-chloroanilinocyclohexane carboxylic acid, M.P. 159° C. after crystallisation from methanol. The 1-p-chloroanilinocyclohexane carboxyamide used as starting material may be obtained from 1-cyano-1-p-chloroanilinocyclohexane by treatment with concentrated sulphuric acid, and has M.P. 170° C. The 1-cyano-1-p-chloroanilinocyclohexane itself may be obtained by treating cyclohexanone and p-chloroaniline in glacial acetic acid with a solution of sodium cyanide, and has M.P. 112° C.

Similarly, 2-chloroanilinoisobutyric acid, M.P. 87–88° C. (from benzene/petroleum ether), is obtained by an analogous series of reactions starting from acetone, o-chloroaniline and sodium cyanide. The corresponding α-2-chloroanilinoisobutyramide and α-2-chloroanilinoisobutyronitrile were not however obtained solid.

What we claim is:

1. A method of reducing the cholesterol content of blood which comprises orally administering to a patient an effective dose of at least one compound selected from the group consisting of compounds having the formula:

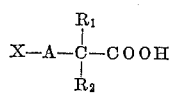

and compounds of the formula:

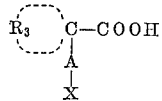

wherein A is selected from the group consisting of oxygen and imino; $R_1$ is lower alkyl; $R_2$ is selected from the group consisting of hydrogen and lower alkyl; $R_3$ represents the methylene groups necessary to form, together with the adjacent carbon atom, a cyclohexyl ring; and X is selected from the group consisting of phenyl, halogenophenyl, alkylphenyl, alkenylphenyl, and alkoxyphenyl; and the lower alkyl esters and alkali metal, alkaline earth metal and acid-addition salts thereof.

2. The method of claim 1 which comprises administering a daily dosage of between about 1.0 and 10 gm. of active ingredient.

3. The method of claim 1 wherein said compound is a lower alkyl ester of p-chlorophenoxyisobutyric acid.

4. The method of claim 1 wherein said compound is at least one compound selected from the group consisting of p-chlorophenoxyisobutyric acid and the lower alkyl esters and alkaline earth metal salts thereof.

References Cited by the Examiner

UNITED STATES PATENTS

| | | | |
|---|---|---|---|
| 2,580,653 | 1/1952 | Bridgeman | 71—2.6 |
| 2,937,117 | 5/1960 | Cottet | 167—65 |
| 2,957,760 | 10/1960 | Tafuro | 71—2.6 |

OTHER REFERENCES

Cavallini, J.A.C.S., vol. 79, 1957, pages 3514–3517 and vol. 81, May 1959, pages 2564–67.

Chem. Abstracts, vol. 51, 1957, page 2906c and page 15861f.

Garattini, Gior. Ital. Di. Che., vol. 2, 1955, pages 60, 63.

Garattini, Arch. Int. Parmacodyn CIX, Nos. 3 and 4, February 1957, pages 400–414.

Chem. Abstr., vol. 50, 1956, pages 15458–15459.

J.A.C.S., vol. 77, 1955, pages 6644–6.

Science, vol. 114, 1951, pages 92–93.

JULIAN S. LEVITT, *Primary Examiner.*

FRANK CACCIAPAGLIA JR., *Examiner.*

A. P. FAGELSON, S. ROSEN, *Assistant Examiners.*